(12) United States Patent  (10) Patent No.: US 7,984,877 B2
Hasmann  (45) Date of Patent: Jul. 26, 2011

(54) AUXILIARY AIRCRAFT FUEL TANKS, SYSTEMS AND METHODS PROVIDING VISUAL LEAK DETECTION

(75) Inventor: Paulo Henrique Hasmann, Florada de São José dos Campos (BR)

(73) Assignee: Embraer—Empresa Brasileira De Aeronautica S.A., Sao Jose dos Campos-SP (BR)

( * ) Notice: Subject to any disclaimer, the term of this patent is extended or adjusted under 35 U.S.C. 154(b) by 758 days.

(21) Appl. No.: 12/019,726

(22) Filed: Jan. 25, 2008

(65) Prior Publication Data

US 2009/0189021 A1 Jul. 30, 2009

(51) Int. Cl.
*B64D 37/02* (2006.01)
(52) U.S. Cl. .................. 244/135 R; 137/312
(58) Field of Classification Search .......... 244/135 R, 244/135 B; 137/312, 264; 220/563, 573, 220/DIG. 6, 4.15
See application file for complete search history.

(56) References Cited

U.S. PATENT DOCUMENTS

| | | | | |
|---|---|---|---|---|
| 2,404,418 A | * | 7/1946 | Brooks | 244/135 R |
| 2,703,607 A | * | 3/1955 | Simmonds | 220/563 |
| 3,096,054 A | * | 7/1963 | Ciminaghi | 244/135 R |
| 4,013,105 A | * | 3/1977 | Uuskallio | 220/573 |
| 4,294,279 A | * | 10/1981 | Wyeth | 137/264 |
| 4,930,648 A | * | 6/1990 | Hundt | 220/DIG. 6 |
| 6,889,940 B1 | * | 5/2005 | Howe | 244/135 R |
| 2005/0115621 A1 | * | 6/2005 | Van Vliet et al. | 137/899 |
| 2007/0181583 A1 | * | 8/2007 | Zacharias | 220/563 |

* cited by examiner

*Primary Examiner* — Galen Barefoot
(74) *Attorney, Agent, or Firm* — Nixon & Vanderhye P.C.

(57) ABSTRACT

Auxiliary fuel tanks are provided with an inner barrier wall defining an interior volume for containing aircraft fuel, an outer barrier wall adjacent the inner barrier wall so as to define a space therebetween, and a drain part having a port in fluid communication with the space to allow leaked fuel within the space to be discharged therefrom. The drain part may be positioned at a corner junction between at least side and bottom walls of the outer barrier wall. In some advantageous embodiments, the drain part is positioned at a corner junction between the side wall, the bottom wall and an end wall of the outer barrier wall. One or more drain parts may be provided on each auxiliary aircraft fuel tank. If a plurality of drain parts are provided, then each drain part will preferably have a port in fluid communication with the space between the inner and outer barrier walls to allow leaked fuel within the space to be discharged therefrom, and each drain part will be positioned at respective corner junctions between at least side and bottom walls of the outer barrier wall, preferably between the side wall, the bottom wall and an end wall of the outer barrier wall. Aircraft may thus be provided with one or more of such auxiliary fuel tanks.

11 Claims, 7 Drawing Sheets

AUXILIARY AIRCRAFT FUEL TANKS, SYSTEMS AND METHODS PROVIDING VISUAL LEAK DETECTION

FIELD OF THE INVENTION

The present invention relates generally to aircraft tanks, systems and methods which allow for an increase in an aircraft's on-board fuel capacity. In preferred forms, the present invention is embodied in aircraft fuselage fuel tank assemblies, systems and methods which provide additional (auxiliary) fuel capacity to the fuel capacity provided by the aircraft's main wing tanks and which have the capability to provide visual detection of fuel leakage.

BACKGROUND AND SUMMARY OF THE INVENTION

Commercial and military transport aircraft are typically designed to carry a given load of passengers, cargo or both, at a given range and/or at a given endurance. Occasionally, the range and/or endurance of the aircraft may need to be increased. Such extended range and/or endurance can be accomplished by installing additional or auxiliary fuel tank systems in the aircraft, typically by positioning fuel tanks physically within the aircraft's fuselage cargo space (i.e., that space within the aircraft's pressurized fuselage which is below the passenger deck). Conventional auxiliary fuel tank systems are typically comprised of additional fuel tanks and their respective equipment, manifolds, and harnesses necessary to manage the additional fuel carried in the tanks.

These additional fuel tanks and systems could come in diverse configurations, for example, with tanks installed under the wings, external to the aircraft or with tanks internal to the fuselage. These additional fuel tanks and systems could be configured to directly supply fuel to the engines or to transfer the fuel to other tanks and from there to feed the aircraft engines or be used to control aircraft center of gravity or even to transfer fuel to other aircraft, in flight or to other vehicles, on ground.

Whatever the reasons to install these additional tanks and systems, they should be at most practical to the aircraft operator. Thus, additional tanks and systems which complement an aircraft's main wing tanks should be relatively simple to install, remove, and integrate into the basic aircraft fuel system. One preferred auxiliary fuel tank system which is adapted to being positioned within the pressurized fuselage of an aircraft is disclosed in commonly owned U.S. patent application Ser. No. 11/637,922 filed on Dec. 13, 2006 (Atty. Dkt. No. 4439-11), the entire content of which is expressly incorporated hereinto by reference.

According to current aircraft certification requirements, auxiliary fuel tanks positioned within the pressurized fuselage must be of a double wall construction so as to provide enhanced protective barriers against fuel leakage. Any fuel which does in fact leak from the inner wall will find its way into the space between the walls and will be discharged outside the aircraft so as to prevent leaked fuel accumulation within the pressurized fuselage. The discharge point of the leaked fuel must also be visible to flight crew and ground personnel so as to provide evidence of a fuel leak from one of the on-board auxiliary fuel tanks. If leakage is detected, the aircraft would be grounded and would then require maintenance personnel to identify and fix the leaking auxiliary fuel tank before the aircraft could again resume flight operations.

Conventional leak detection systems provide for a drain port positioned generally in the center portion of an auxiliary fuel tank's bottom wall. Several problems ensue from such a center-positioned drain port. For example, since the drain port is located physically on the bottom wall of the auxiliary fuel tank, some space below the tank must be provided in order to accommodate the drain port fittings and drain tubing. Furthermore, this conventional center-positioned drain port may delay the time that fuel leakage is actually detected. That is, since the drain port is located in the center portion of the bottom tank wall, it is conceivable that certain aircraft attitudes may preclude fuel from actually reaching the drain port. As such, an increased quantity of leaked fuel would first need to be accumulated (with corresponding increased time) within the barrier wall space which would then be sufficient to flow into the drain port.

It would therefore be desirable if improvements could be made to auxiliary aircraft fuel tanks that would provide enhanced visual leak detection. It is towards providing such improvements that the present invention is directed.

In certain embodiments, auxiliary fuel tanks are provided having an inner barrier wall defining an interior volume for containing aircraft fuel, an outer barrier wall adjacent the inner barrier wall so as to define a space therebetween, and a drain part having a port in fluid communication with the space to allow leaked fuel within the space to be discharged therefrom. The drain part may be positioned at a corner junction between at least side and bottom walls of the outer barrier wall. In some advantageous embodiments, the drain part is positioned at a corner junction between at least two adjacent walls (e.g., the side and bottom walls), preferably three adjacent walls (e.g., the side, bottom wall and end walls) of the outer barrier wall.

One or more drain parts may be provided on each auxiliary aircraft fuel tank. If a plurality of drain parts are provided, then each drain part will preferably have a port in fluid communication with the space between the inner and outer barrier walls to allow leaked fuel within the space to be discharged therefrom, and each drain part will be positioned at respective corner junctions between at least side and bottom walls of the outer barrier wall, preferably between the side wall, the bottom wall and an end wall of the outer barrier wall.

Aircraft may thus be provided with one or more of such auxiliary fuel tanks.

Visual leak detection systems are also provided for auxiliary aircraft fuel tanks. In this regard, such visual leak detection systems will include an auxiliary aircraft fuel tank positioned within a pressurized space of an aircraft fuselage, the auxiliary aircraft fuel tank having an inner barrier wall defining an interior volume for containing aircraft fuel, an outer barrier wall adjacent the inner barrier wall so as to define a space therebetween, a drain part having a port in fluid communication with the space to allow leaked fuel within the space to be discharged therefrom, wherein the drain part is positioned at a corner junction between at least side and bottom walls of the outer barrier wall. A discharge manifold is provided so as to discharge leaked fuel exterior of the aircraft fuselage. Tubing fluid-connects the port of the drain part to the discharge manifold. In such a manner, leaked fuel is directed through the drain part from the space between the inner and outer barrier walls to the exterior of the aircraft where it may be visually detected. Again, one or more of such auxiliary fuel tanks may be provided within an aircraft's pressurized fuselage.

These and other aspects and advantages will become more apparent after careful consideration is given to the following detailed description of the preferred exemplary embodiments thereof.

BRIEF DESCRIPTION OF THE ACCOMPANYING DRAWINGS

Reference will hereinafter be made to the accompanying drawings, wherein like reference numerals throughout the various FIGURES denote like structural elements, and wherein.

DETAILED DESCRIPTION OF THE INVENTION

Figure 1:
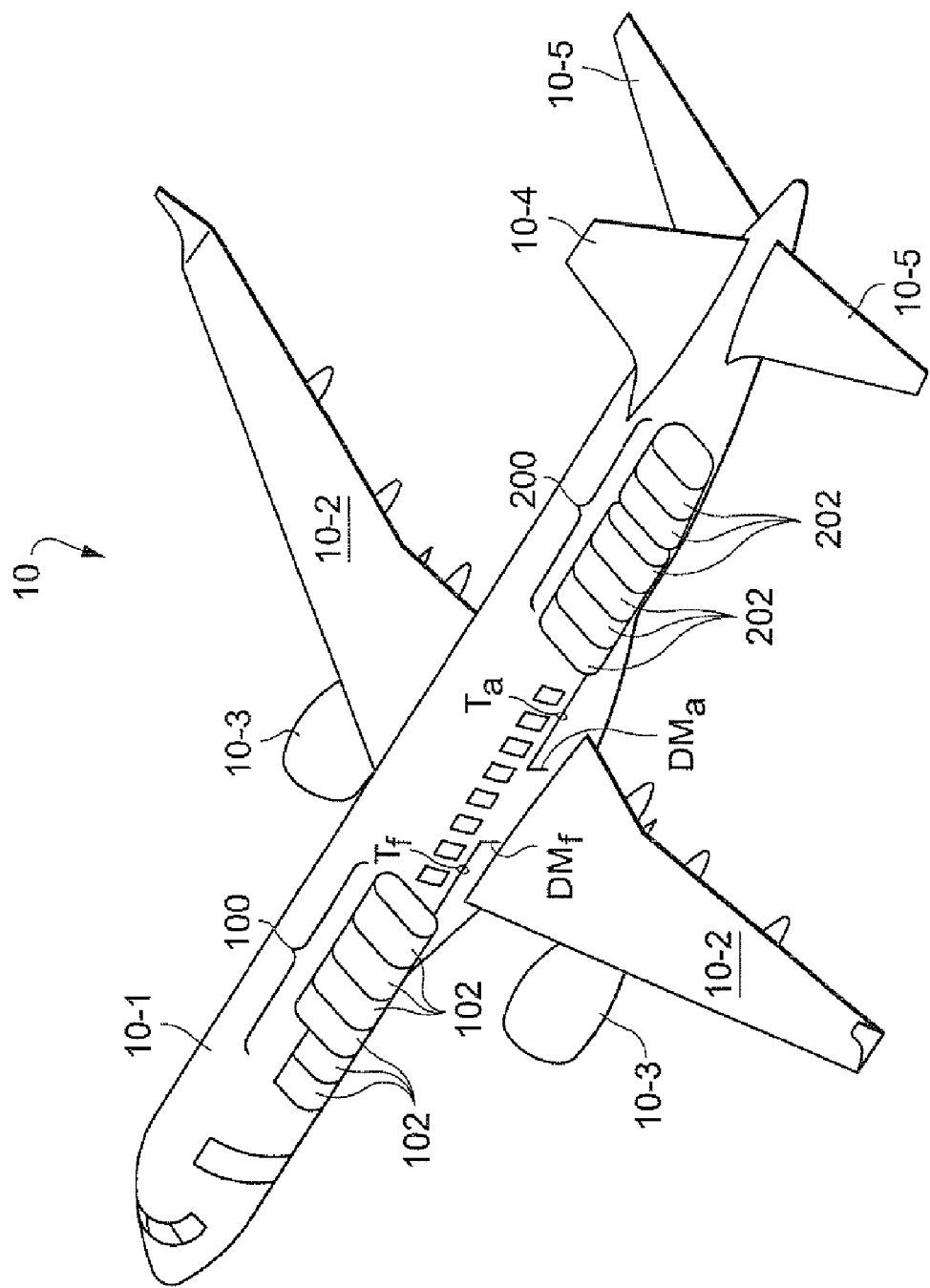
FIG. 1 is a rear perspective x-ray view of an aircraft provided with forward and aft auxiliary fuel tanks.

As shown schematically in accompanying FIG. 1, an aircraft 10 has a fuselage 10-1, a pair of wings 10-2 extending generally laterally from the fuselage 10-1 and wing-mounted engines 10-3 to provide the required thrust to the aircraft 10. In this regard, although multiple wing-mounted engines 10-3 are shown, it will of course be understood that the present invention could be utilized satisfactorily with one or more fuselage mounted engines. Stability in the yaw and pitch axes for the aircraft 10 are provided by tail-mounted vertical and horizontal stabilizers 10-4, 10-5, respectively.

As is conventional, the pressurized interior of the aircraft fuselage 10-1 is provided with forward and aft cargo compartments which are accessed respectively by one or more cargo compartment doors (not shown). Respectively positioned within these forward and aft cargo compartments are a forward auxiliary fuel tankage 100 and an aft auxiliary fuel tankage 200 each having a number of individual auxiliary fuel tanks 102, 202, respectively. Each of the individual tanks 102, 202 comprising the forward and aft fuel tankages 100, 200, respectively, are most preferably sized and configured to allow for passage through the forward and aft cargo compartment doors for removable positioning within the forward and aft cargo compartments, respectively. Of course, if desired the forward and aft fuel tankages 100, 200 respectively, may be more permanently mounted to the aircraft fuselage structure.

Each of the individual tanks 102, 202 has a double wall construction defining a leakage space therebetween since each is positioned within the pressurized aircraft fuselage 10-1. Suitable forward and aft tubing runs $T_f$ and $T_a$ are operably connected to the fuel tanks 102, 202 so as to direct any fuel that leaks therefrom to forward and aft drain manifolds $DM_f$ and $DM_a$, respectively. The drain manifolds $DM_f$ and $DM_a$ discharge fuel externally of the fuselage 10-1 where it can visually be detected. Upon discharge of the leaked fuel from the drain manifolds $DM_f$ and/or $DM_a$, therefore, personnel will be able to visually detect the leakage and thereby determine that one of the auxiliary fuel tanks 102, 202 is leaking fuel.

Figure 2:
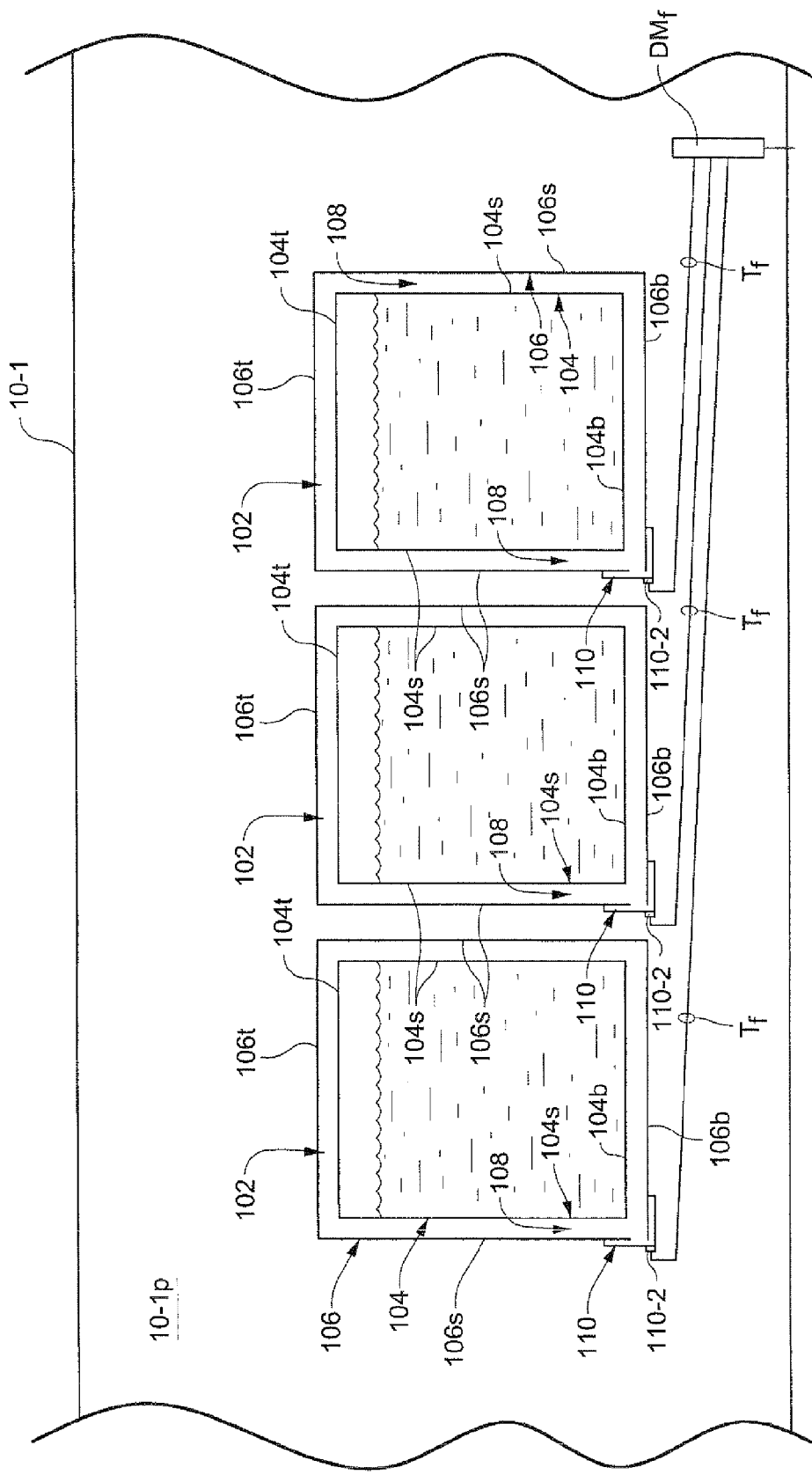
FIG. 2 is a schematic cross-sectional view of the aircraft fuselage with several auxiliary fuel tanks therein which are provided with visual leak detection capabilities.

A representative number of the forward auxiliary fuel tanks 102 is represented schematically in accompanying FIG. 2. The representation in FIGS. 2-6 and the discussion which follows with regard to the same are also applicable to the aft auxiliary fuel tanks 202. Thus, while certain structures such as aft tubing run $T_a$ and drain manifolds $DM_a$ associated with the aft auxiliary fuel tanks 202 are not specifically shown in FIGS. 2-6, the reader will appreciate that such structures are equivalent to forward tubing run $T_f$ and drain manifolds $DM_f$ associated with the forward auxiliary fuel tanks 102.

As shown, the tanks 102 are positioned within the pressurized interior 10-1p of the aircraft fuselage 10-1. Also as shown, each of the tanks 102 is provided with an inner barrier wall 104 and an outer barrier wall 106 which defines therebetween a leak space 108. Fuel which may leak through the inner barrier wall 104 will therefore accumulate within the space 108.

The inner and outer barrier walls 104, 106 are each provided with opposed pairs of bottom walls 104b, 106b, top walls 104t, 106t and side walls 104s, 106s, respectively. End walls (not shown but see walls 106e-1 through 106e-4 in FIG. 3) are also provided and can be configured in a variety of ways to provide for a tank configuration that will be accommodated within the pressurized space 10-1p of the aircraft fuselage 10-1.

A corner drain part 110 is provided at a corner junction between a side wall 106s and a bottom wall 106b of the tank 102. The corner drain part 110 includes a drain port 110-1 (not shown in FIG. 2 but see FIG. 5) to which a nipple 110-2 and its accompanying seal ring 110-3 may be coupled. A forward end of the tubing $T_f$ may in turn be connected to the nipple 110-2 so as to fluid connect the drain port 110-1 to the drain manifold $DM_f$.

Figure 3:
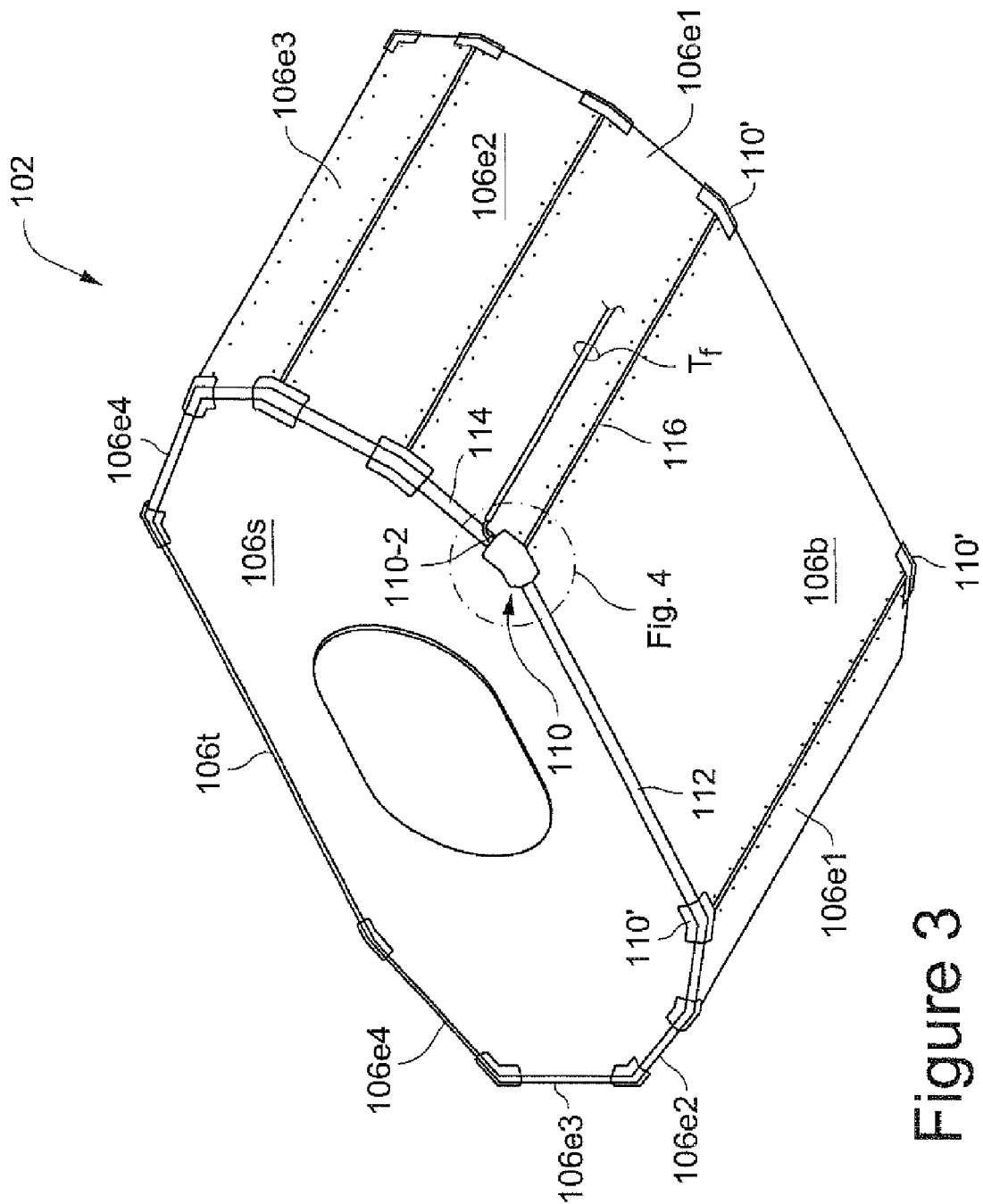
FIG. 3 is bottom perspective view of an exemplary auxiliary fuel tank which embodies a leak detection system according to the present invention.

Accompanying FIGS. 3-6 show in greater detail the drain part 110 and its positioning with respect to the side and bottom walls 106s and 106b of the outer barrier wall 106 associated with an exemplary auxiliary fuel tank 102. In this regard, the particular tank 102 shown in FIGS. 3-6 is comprised of several segmented end walls 106e1 through 106e4 which extend between the pair of separated opposed side walls 106s and join progressively the bottom wall 106b and its opposed top wall 106t. As shown in FIG. 3, the drain part 110 is positioned at a corner junction of the side wall 106s, bottom wall 106b and end wall 106e1 as it represents a low point for the entire tank 102.

Figure 4:
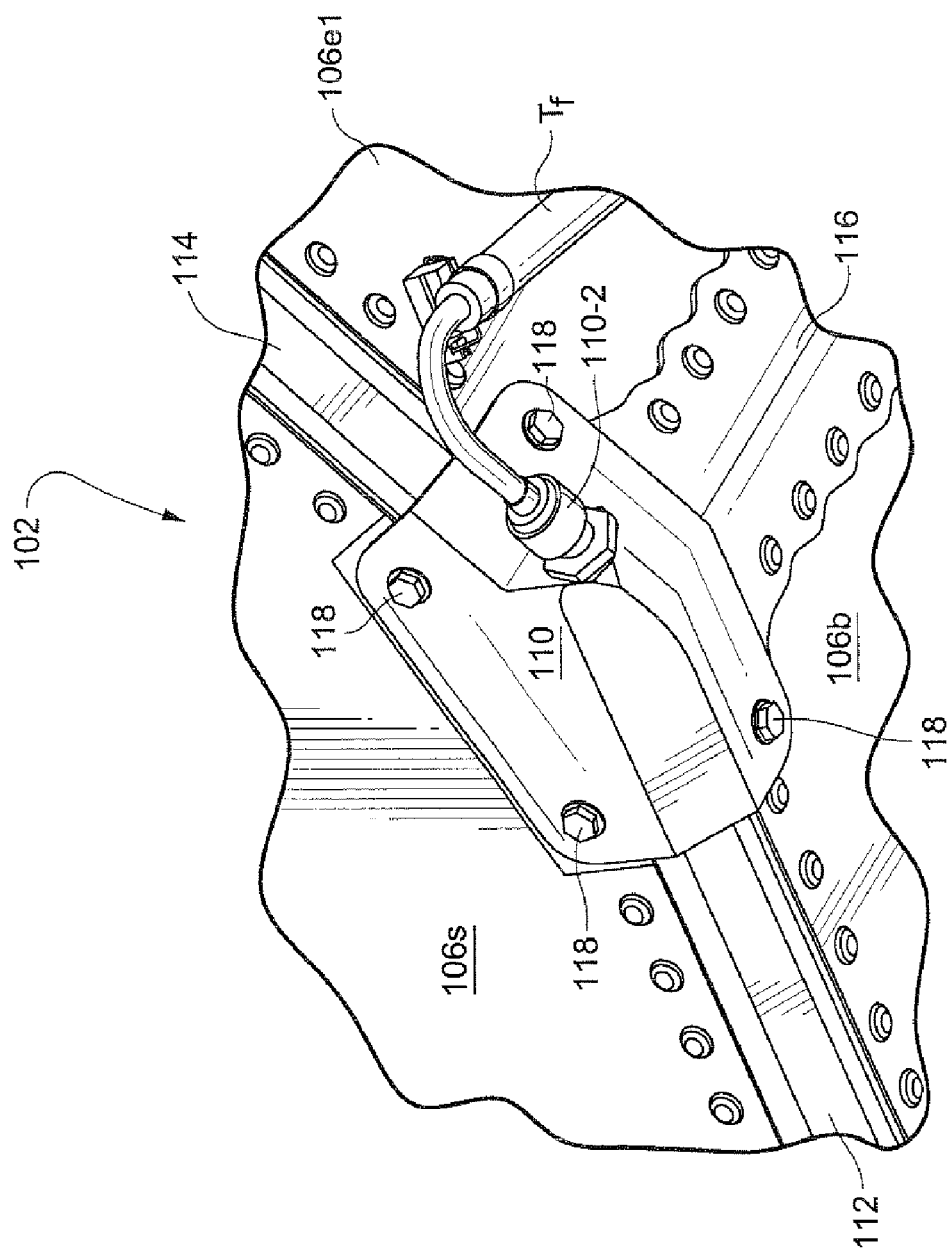
FIG. 4 is a detailed perspective view of the corner drain part depicted in the auxiliary fuel tank of FIG. 3.
Figure 5:
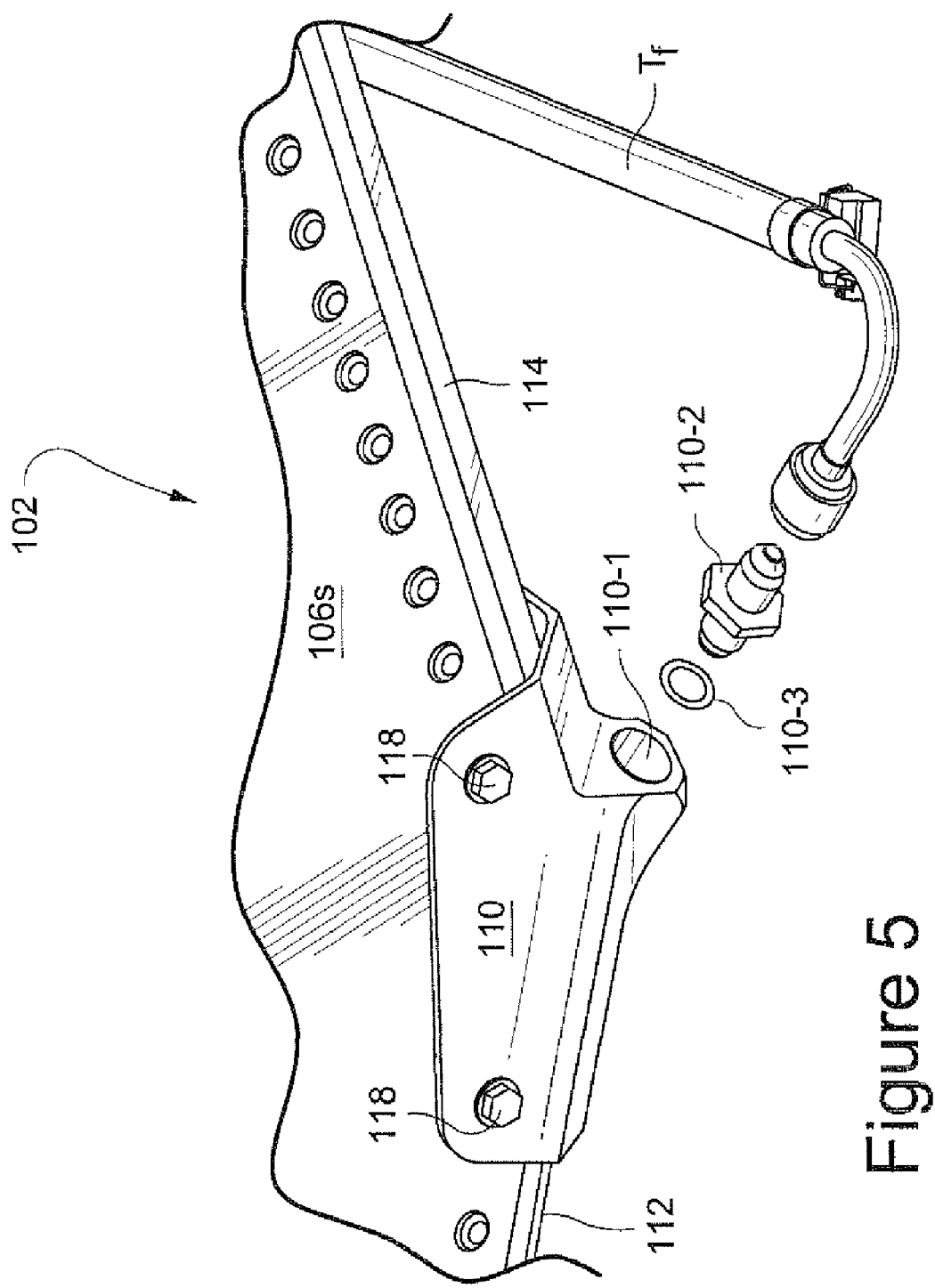
FIG. 5 is an exploded perspective view of the corner drain part depicted in FIG. 4.
Figure 6:
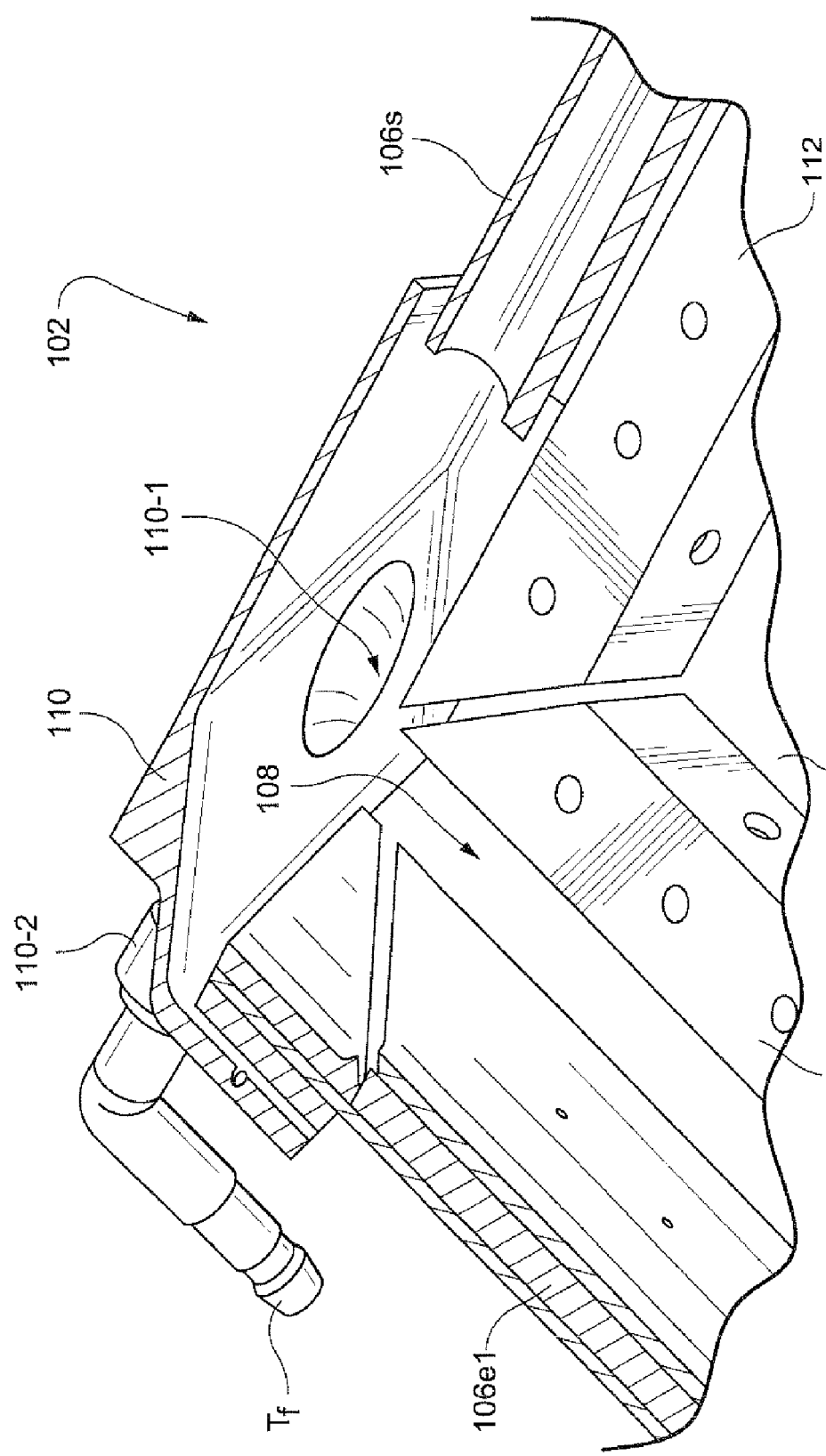
FIG. 6 is an internal cross-sectional view of the corner drain part depicted in FIG. 4.
Figure 7A:
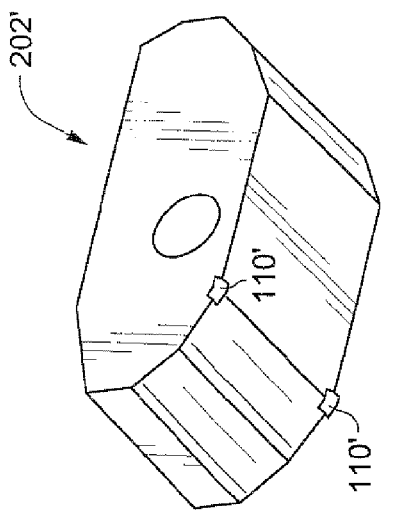
FIGS. 7A through 7F depict various types of auxiliary fuel tanks that may be provided with one or more corner drain parts as depicted in FIG. 4.
Figure 7B:
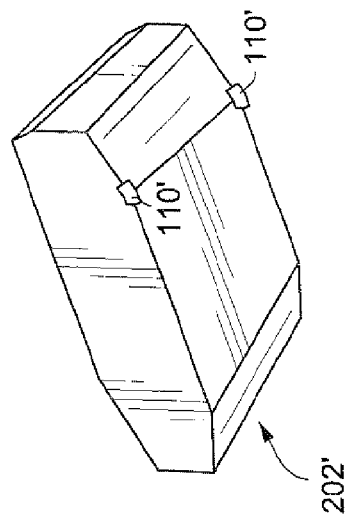
Figure 7C:
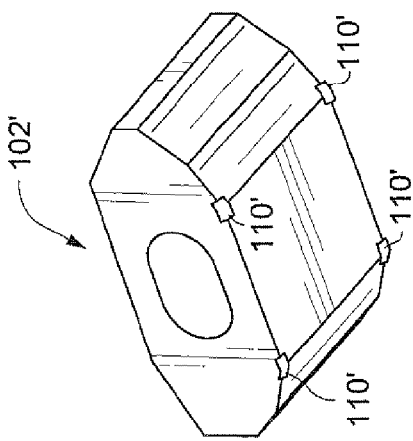
Figure 7D:
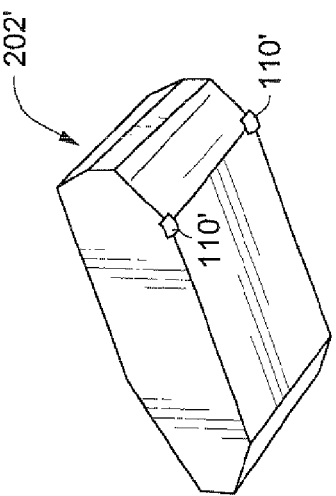
Figure 7E:
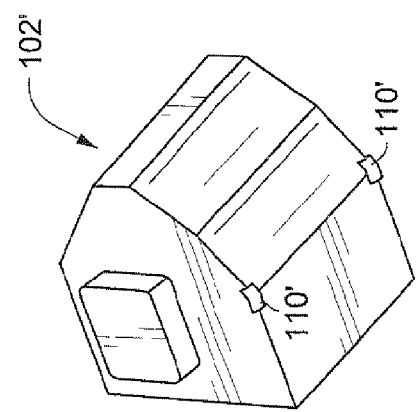
Figure 7F:
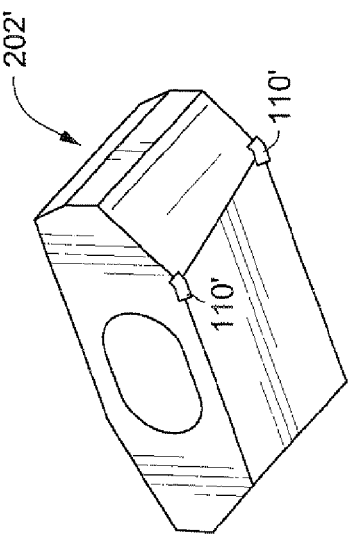

It will especially be observed in FIGS. 4 and 5 that the side and bottom 106s and 106b on the one hand, and the side and end wall 106e1 on the other hand are joined to one another by means of rigid elongate corner supports 112, 114, respectively. A similar support 116 is present to join the adjacent end wall 106e1 and the bottom wall 106b. These corner supports 112, 114 and 116 thereby serve to join the respective walls 106s, 106b and 106e1 together and provide structural support for the tank 102. Thus, in the embodiment depicted, the corner supports 112, 114 and 116 will each be truncated at their corner junction between all three walls 106s, 106b and 106e1 to allow accommodation of the corner drain part 110. The corner drain part 110 is itself most preferably a rigid machined part which can be joined to the walls 106s, 106b and 106e1 by suitable fasteners 118 (e.g., screws, rivets or the like) and thereby be sealed against fuel leakage with the supports 112, 114 and 116. As such, the corner drain part 110 may serve as a structural component to likewise join the respective walls 106s, 106b and 106e1 one to another.

The tank 102 may be provided with one or any number of drain parts 110. Thus, as shown in FIG. 3, one or more additional drain parts 110' may be provided at other corresponding corner junctions between the side wall 106s, bottom wall 106b and end wall 106e1. In addition, although not specifically depicted, a drain part 110 may be provided at a junction between two walls, for example at a junction between the side and bottom walls 106s, 106b, respectively, and/or at a junction between the bottom and end walls 106b, 106e1, respectively. It is however presently preferred that the drain part 110 be provided at a junction between three tank walls, for example, the side wall 106s, bottom wall 106b and end wall 106e1 as shown in FIGS. 3 and 4.

Accompanying FIGS. 7A-7B and 7C-7F depict a variety of forward auxiliary fuel tanks 102' and aft auxiliary fuel tanks 202', respectively, that may be provided with one or more drain parts 110' as described previously at wall junctions thereof.

While the invention has been described in connection with what is presently considered to be the most practical and preferred embodiment, it is to be understood that the invention is not to be limited to the disclosed embodiment, but on the contrary, is intended to cover various modifications and equivalent arrangements included within the spirit and scope of the appended claims.

What is claimed is:

1. An auxiliary aircraft fuel tank comprising:
   an inner barrier wall defining an interior volume for containing aircraft fuel;
   an outer barrier wall adjacent the inner barrier wall so as to define a space therebetween, the outer barrier wall including at least two adjacent walls having a truncated corner junction region; and
   a rigid drain part connected to the at least two adjacent walls at the truncated corner junction region so as to provide a structural component joining the at least two adjacent wall panels one to another, wherein the drain part includes a port in fluid communication with the space to allow leaked fuel within the space to be discharged therefrom.

2. An auxiliary aircraft fuel tank as in claim 1, wherein the drain part is positioned at a corner junction between at least three adjacent walls of the outer barrier wall.

3. An auxiliary aircraft fuel tank as in claim 1, wherein the outer barrier wall includes an elongate support joining the at least two adjacent walls thereof, the elongate support being truncated at an end of the corner junction between the at least two adjacent walls to accommodate the drain part.

4. An auxiliary aircraft fuel tank as in claim 1, which comprises a plurality of rigid drain parts, each drain part having a port in fluid communication with the space to allow leaked fuel within the space to be discharged therefrom, wherein each of the drain parts is positioned at respective corner junctions between at least side and bottom walls of the outer barrier wall.

5. An auxiliary aircraft fuel tank as in claim 4, wherein each of the drain parts is positioned at a respective truncated corner junction between the side wall, the bottom wall and an end wall of the outer barrier wall.

6. An aircraft which includes an auxiliary aircraft fuel tank as in any one of claims 1-5.

7. A visual leak detection system for auxiliary aircraft fuel tanks comprising:
   an auxiliary aircraft fuel tank positioned within a pressurized space of an aircraft fuselage, the auxiliary aircraft fuel tank including,
   an inner barrier wall defining an interior volume for containing aircraft fuel;
   an outer barrier wall adjacent the inner barrier wall so as to define a space therebetween, the outer barrier wall including at least two adjacent walls having a truncated corner junction region; and
   a rigid drain part connected to the at least two adjacent walls at the truncated corner junction region so as to provide a structural component joining the at least two adjacent wall panels one to another, wherein the drain part includes a port in fluid communication with the space to allow leaked fuel within the space to be discharged therefrom;
   a discharge manifold to discharge leaked fuel exterior of the aircraft fuselage; and
   tubing fluid-connecting the port of the drain part to the discharge manifold, wherein leaked fuel is directed through the drain part from the space between the inner and outer barrier walls to the exterior of the aircraft where it may be visually detected.

8. A visual leak detection system as in claim 7, wherein the aircraft fuselage comprises a plurality of auxiliary aircraft fuel tanks.

9. An aircraft which comprises a visual leak detection system as in claims 7 or 8.

10. A method of providing visual leak detection to an auxiliary aircraft fuel tank having an inner barrier wall defining an interior volume for containing aircraft fuel, and an outer barrier wall adjacent the inner barrier wall so as to define a space therebetween, the method comprising positioning an auxiliary aircraft fuel tank as in claim 1 within an aircraft such that leaked fluid which flows through the port of the drain part can be visually detected.

11. A method as in claim 10, further comprising providing a discharge manifold to discharge leaked fuel exterior of an aircraft fuselage, and fluid connecting the discharge manifold to the port of the drain part by tubing.

\* \* \* \* \*